(12) United States Patent
Lyon (10) Patent No.: US 9,396,188 B2
(45) Date of Patent: Jul. 19, 2016

(54) ASSIGNING TAGS TO DIGITAL CONTENT

(75) Inventor: Clifford Lyon, Melrose, MA (US)

(73) Assignee: CBS Interactive Inc., San Francisco, CA (US)

( * ) Notice: Subject to any disclaimer, the term of this patent is extended or adjusted under 35 U.S.C. 154(b) by 910 days.

(21) Appl. No.: 12/951,247

(22) Filed: Nov. 22, 2010

(65) Prior Publication Data

US 2011/0225163 A1    Sep. 15, 2011

Related U.S. Application Data

(63) Continuation of application No. 12/950,169, filed on Nov. 19, 2010, now abandoned.

(60) Provisional application No. 61/312,032, filed on Mar. 9, 2010.

(51) Int. Cl.
*G06F 17/30* (2006.01)
*G06F 17/24* (2006.01)

(52) U.S. Cl.
CPC ........ *G06F 17/30011* (2013.01); *G06F 17/241* (2013.01)

(58) Field of Classification Search
USPC ........................... 707/740; 715/207, 234, 236
See application file for complete search history.

(56) References Cited

U.S. PATENT DOCUMENTS

| | | |
|---|---|---|
| 5,924,096 A | 7/1999 | Draper et al. |
| 6,859,799 B1 | 2/2005 | Yuen |
| 7,243,102 B1 | 7/2007 | Naam et al. |
| 2004/0064449 A1 | 4/2004 | Ripley et al. |
| 2005/0027670 A1 | 2/2005 | Petropoulos |
| 2007/0067297 A1* | 3/2007 | Kublickis ........................ 707/9 |
| 2007/0174247 A1* | 7/2007 | Xu et al. .......................... 707/3 |
| 2007/0244892 A1 | 10/2007 | Narancic |
| 2007/0299949 A1 | 12/2007 | Macbeth et al. |
| 2008/0201348 A1* | 8/2008 | Edmonds et al. ............. 707/101 |
| 2009/0063447 A1 | 3/2009 | Bailey et al. |
| 2009/0222329 A1* | 9/2009 | Ramer et al. .................... 705/10 |
| 2010/0030736 A1 | 2/2010 | Chi et al. |
| 2010/0082575 A1 | 4/2010 | Walker et al. |
| 2010/0138427 A1 | 6/2010 | Van De Par et al. |

\* cited by examiner

*Primary Examiner* — Shyue Jiunn Hwa (74) *Attorney, Agent, or Firm* — Marc S. Kaufman; Reed Smith LLP (57) ABSTRACT

Assigning tags to content on a page stored within a digital document environment is described. An activity log is received for a document including data indicating search queries resulting in the location of the document by a search engine. One or more keywords are determined from the activity log, and the document is tagged with a tag associated with the keywords.

26 Claims, 9 Drawing Sheets

FIG. 1

Document 32

- Document ID
- Collection ID
- Location ID (URI)
- Document Text
- Document Title
- Document Summary
- Document Author
- Publication Date
- External Tags
- External Topics

ASSIGNING TAGS TO DIGITAL CONTENT

CROSS-REFERENCE TO RELATED APPLICATIONS

This application claims priority from and is a continuation of U.S. application Ser. No. 12/950,169, filed Nov. 19, 2010 now abandoned, which in turn claims priority from U.S. Provisional Application No. 61/312,032, filed Mar. 9, 2010, entitled "Method and Apparatus for Assigning Tags to Digital Content," the entirety of which is hereby incorporated by reference.

TECHNICAL FIELD

The present document relates to content classification and discovery. More particularly, to assigning tags to digital content.

BACKGROUND

Most content is now stored in digital format and accessible over networks. For example, Document Management Systems (DMS) provide repositories of documents that can be searched and accessed over a network. Most DMS implementations are within a domain, such as a company, and are used to store documents that can be categorized in a relatively narrow set of topics. For example, a law firm may have legal briefs and other legal documents stored in a DMS. Also, downloadable or streaming media content is available in various domains.

Of course, various repositories of documents and other content can be accessed over the Internet. The most common way of discovering content on the internet is through the use of search engines, which index the content and then provide links to the content in response to keyword or topical search queries. More recently, it has become popular to associate topical or other descriptive tags, from a set of tags, with content to facilitate content discovery and retrieval. The set of tags can be arranged in an ontology or other arrangement and applied to content in a manner which helps describe the content. Ideally, the set of tags associated with a document represent a compressed or minimal description of the document, which serves to both associate the document with its most similar neighbors, and to discriminate it from others unlike it.

However, there are many limitations to developing a set of tags and associating tags with content. For example, different domains may use different sets of tags and tag arrangements. This may cause inconsistencies and even lack of interoperability between domains. Even within a domain with a predetermined tag arrangement, the sheer amount of content makes it difficult to apply tags in a meaningful manner. There are tools for automated tagging. However, such tools are limited and are not effective across broad spectrums of topics and content.

DETAILED DESCRIPTION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Assigning tags to digital content is described. In the following description, for purposes of explanation, numerous specific details are set forth in order to provide a thorough understanding of the various embodiments. It is apparent to one skilled in the art, however, that the description of various embodiments can be practiced without these specific details or with an equivalent arrangement. In some instances, well-known structures and devices are shown in block diagram form in order to avoid unnecessarily obscuring the various embodiments.

There is a need in the art for assigning a tag to content on a page stored within a searchable digital document environment. According to some embodiments, a method includes receiving an activity log for a document, said activity log including data indicating search queries resulting in the location of the document by a search engine, determining, from the activity log, at least one keyword in a search query that resulted in location of the document, and assigning a tag to the document with a tag associated with the at least one keyword.

According to some other embodiments, an apparatus is a computer system programmed with instructions to accomplish these functional steps. The document can be the content to be tagged, or a document related to the content to be tagged. For example, the document can be a document describing video content available for downloading or streaming and which is to be tagged.

According to some other embodiments, a computer readable storage medium storing one or more programs configured for execution by a computing device is described. The one or more programs comprise, in a digital content environment, instructions for receiving an activity log for a content item, said activity log including data indicating search queries resulting in a location of the content item by a search engine; instructions for determining at least one keyword in a search query based on the activity log that resulted in the location of the content item; and instructions for assigning the content item to a tag associated with the at least one keyword.

According to some other embodiments, a method for assigning a tag to a content item includes receiving at least one content item. At least one term is determined based on a search query that brought a respective user to the at least one content item. A tag is assigned to the content item, wherein the at least one term is associated with the tag and the term is useful in describing the content item. The tag is placed in a categorization structure that includes at least one tag set.

According to some other embodiments, a computer readable storage medium storing one or more programs configured for execution by a computing device is described. The one or more programs comprise instructions for receiving at least one content item; instructions for determining at least one term based on a search query that returned a search result including the at least one content item, the at least one term being useful in describing the content item; instructions for assigning a tag to the content item, wherein the tag is associated with the at least one term; and instructions for placing the tag in a categorization structure that includes at least one tag set.

Still other aspects, features and advantages of the various embodiments are readily apparent from the following detailed description, simply by illustrating a number of embodiments and implementations, including the best mode contemplated for carrying out the present description of the technology. The present description of the technology also is capable of other and different embodiments, and its several details can be modified in various respects, all without departing from the spirit and scope of the present technology. Accordingly, the drawings and descriptions are to be regarded as illustrative in nature, and not as restrictive.

Figure 1:
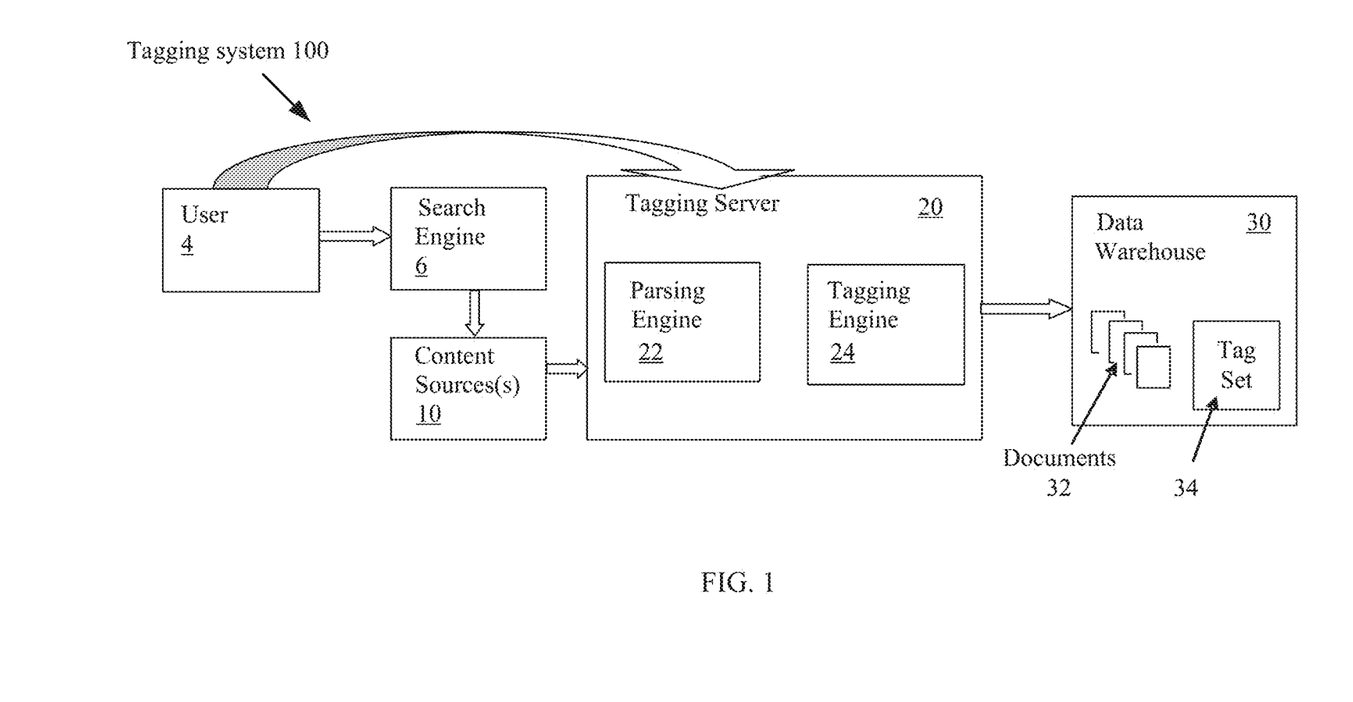
FIG. 1 is a block diagram of a computer system of one embodiment.

Referring now to the drawings, wherein like reference numerals designate identical or corresponding parts throughout the several views, FIG. 1 illustrates an embodiment of a tagging system 100. Tagging system 100 may include one or more tagging tools provided by commercial software products and solutions available from various vendors, such as Hapax Amplify™, Attensit™, Autonomy™, Biz360™, BuzzLogic™, Clarabridge™, IBM™, Infonic™, Inform™, Lexalytics™, TextDigger™, Leximancer™, MotiveQuest™, and RavenPack™. As noted above, tagging tools, automated or otherwise, are well known.

Tagging system 100 receives content, processes the content to extract useful information, and provides access to the content for publishing, runtime processing, and analysis. Content can be received from content sources 10 in various ways, such as by being pushed to the tagging system 100 by a remote service, by being imported from a remote source, and/or through crawling the content source. Accordingly, the phrase "receiving content" as used herein means that the content is made accessible directly or indirectly to tagging system 100.

Content sources 10 can be any sources of content such as, but not limited to, web sites, RSS feeds, blogs or other user generated content, social networks, catalog data, document management systems or the like. Content from content sources 10 is made available to tagging server 20 through a web crawler sent out by tagging server 20 or other mechanism as noted above. Tagging server 20 has parsing engine 22 which parses and analyses the content and performs one or more of the following operations: define a tag(s), define a term(s), define a topic(s), and/or provide an interface for manually introducing defined topics.

Parsing engine 22 can define a notion of a tag, which has a representation that can semantically describe content, as well as metadata, such as links to other tags, documents or topics, thereby placing the tag in an ontology or other set of tags. A tag may be defined by any word, string, topic, and/or term that describes a document or has an associated meaning (e.g., metadata). For example, a tag may be a topic describing a classification for a document or a term contained in the document.

Parsing engine 22 can define a notion of a term or terms in a document that is useful in describing the document. For example, a term or terms may be a keyword or search term. Parsing engine 22 may also define terms and topics based on any search terms that brought users to respective documents, e.g., the user selected the document from a search result list. In addition, parsing engine 22 can define a notion of a topic, e.g. a term that is also useful as a category. Parsing engine 22 can also provide an interface for permitting manually defined topics to be introduced, allowing editing of topics, terms, and tags, and providing analytical data regarding content and the creation and use of tags and topics.

Tagging engine 24 of tagging server 20 associates tags with documents 32 based on content item as previously described (e.g., as defined by parsing engine 22), and stores the documents 32 in data warehouse 30. Other data for the tagging system 100 may be stored in the data warehouse 30 to be harvested by the parsing engine 22. In some embodiments, the tagging engine 24 may be a service provided by a commercial software product or solution previously described. Data warehouse 30 may be accessed locally or from a remote location external to the tagging system 100. The tag or tags may be categorized or grouped into tag set 34. Tag set 34 is also stored in data warehouse 30.

Figure 2:
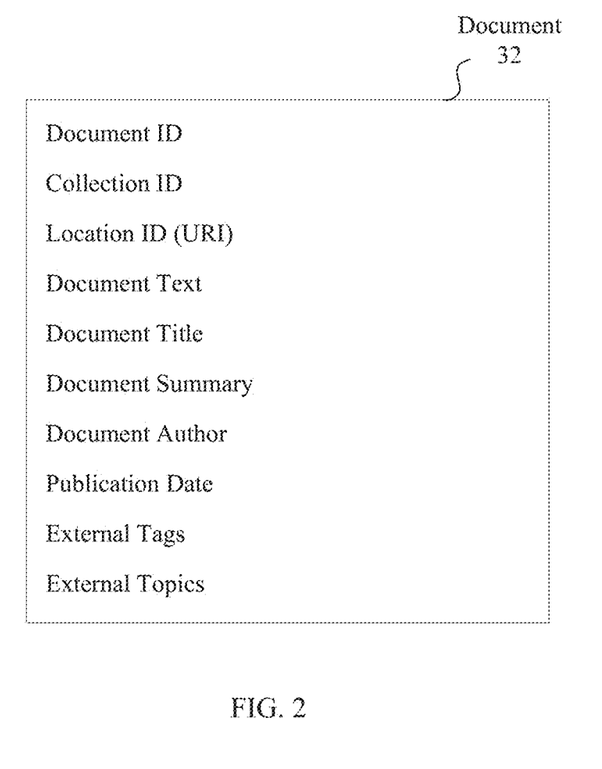
FIG. 2 is a representation of a raw document according to one embodiment.

As noted above, documents 32 are an output of parsing engine 22. An example of a document 32 is illustrated in FIG. 2. Document 32 is created for each content item analyzed by tagging system 100 and can include a global sequence unique raw document ID, a collection ID indicating the content source 10 of the content item, a content item location ID (such as a URL), the text of the content item, title, summary, author publication date and so on of the content item, and a list of tags. The list of tags can potentially be empty and can include tag type, tag identification, and topics. Each tag in the list may have a weight value, indicating the strength of the association. Tags can be assigned and associated with content subsequently by tagging engine 24. Tags can be assigned to content items in any manner. For example, tags can be added to metadata in a document or can be recorded in a database as being associated with a content item.

A user, having user computing device 4, provides a query, such as a series of keywords, to search engine 6 in a known manner. Search engine 6 processes the query, to find content items in content sources 10 in a known manner. For example, search engine 6 can use an inverted index of the content items to match the content items to the key words in the query in a known manner.

Figure 3:
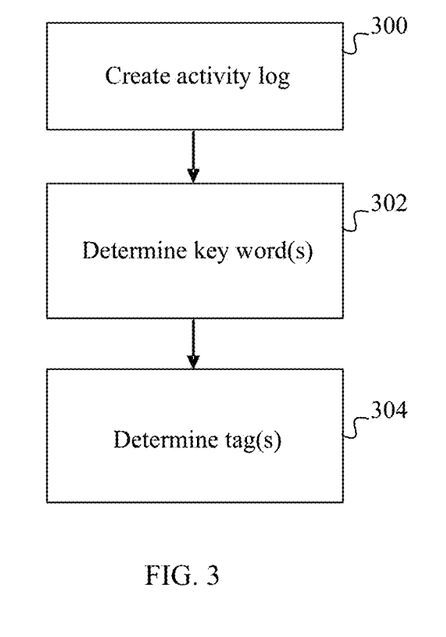
FIG. 3 is a flowchart illustrating a tagging process according to one embodiment.

FIG. 3 illustrates the tagging operations of an embodiment. In step 300, an activity log is created for a content item. The activity log can include data relating to search queries resulting in the location of the content item by search engine 6. One or more keywords in search phrases that are tracked in the activity log may be used as a source for tags. In step 302, at least one keyword in a search query that resulted in location of the document is determined based on the activity log. In step 304, the document is tagged with a tag associated with the at least one keyword. As an example, a query having the keyword DOG might be associated in tag set 34 with the tag CANINE or the tag PET.

Figure 4:
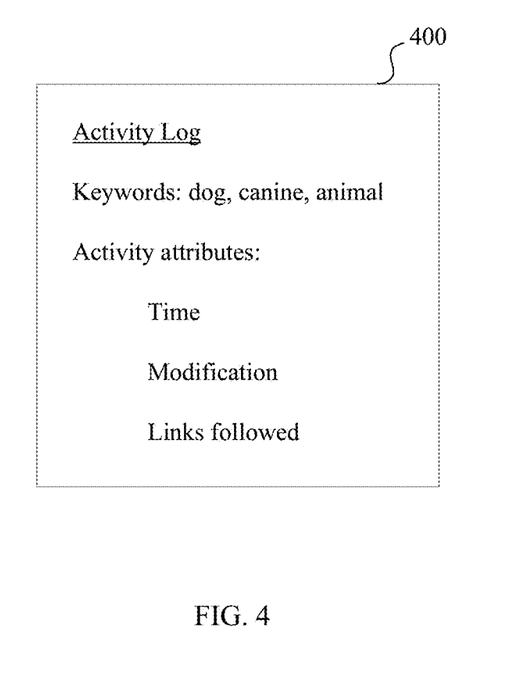
FIG. 4 is an example of an activity log according to one embodiment.

FIG. 4 illustrates an example of an activity log 400 for a content item within a searchable digital content item environment. The activity log of the embodiment records data about search queries that result in location of the content item. The location of the content item may be the location of a document resulting from the user navigating to the document. This recorded data can include keywords of the search as well other query data. The activity log 400 may also include document activity attributes, such as the time spent viewing the document as a result of the search, links activated in the content item, edits or modifications made to the content item and the like. In some embodiments, these attributes may also be used to determine the appropriate tag(s) for the content item. It can be seen that the embodiment leverages user judgment in forming queries and in reviewing documents to ascertain document topics and relevancy.

In some embodiments, each candidate search phrase is processed and scored before being added to a tag set. Tagging a set of content items, such as keywords of one or more search queries, may be determined by calculating a relative score for the content items in the set. The content items may be based on a predetermined score range. Various attributes may be considered in determining ranking Search phrases may be harvested from a data repository, such as data warehouse 30, as part of a more general query for URL activity. Keyword sets may be harvested according a category or attribute, such as type of search engine or terms characterized by marked and monotonically increasing frequency over a predetermined time period. Content items may be prioritized according to documents having the most activity, such as number of pageviews. Any search terms that resulted in the location of one or more documents or a particular set of documents are also identified for processing.

In some embodiments, the process for promoting a search term to a tag is as follows:

1. Compute frequency of all keywords for a given set of documents or feed. Keywords will be related by feed, for example, "CBS News" or "Sports" keywords.

2. Compute percentile rank for each keyword. First, score each keyword based on frequency of occurrence. For example, rank may be based on the percentage of values less than a score. That is, a rank of 30 would indicate that search phrase had a score greater than 30% of all the search phrase scores. The percentile rank may be an adjusted percentile rank; for example, adjusting for the fact that standard metric uses values less than or equal to a given score, rather than less than.

3. For each document, score each keyword based on the percentile rank of that keyword.

The percentile ranks may be computed per document, which may or may not be cached.

The relevant function corresponding to the process above is as follows:

Function to score keywords:

```
def scoreKeywords(self, freqs):
    """ return the keywords """
    ret = [ ]
    # each kw is a (term, weight) pair
    for kw in set(self._kw):
        ret.append((kw[0], pctValuesLessThan(freqs, kw[1])))
    self._scored_keywords = \
        sorted(ret, key=itemgetter(1),
            reverse=True)[0:NUM_KEYWORDS]
    return self._scored_keywords
```

In an alternate process, "fast-rising search terms may be extracted from the set of all search terms coming into target sites, e.g., CBS Interactive sites, in a predetermined period of time (e.g., recent week). Fast-rising phrases may be used to redo a search. In contrast to a popular search term, such as "spyware", a fast-rising search term is characterized by a marked and monotonically increasing frequency over the examined period. The motivation is to, for example, capture "breaking" news when it happens, e.g., "Gulf Oil Spill" was initially a fast-rising term, but after short period gave way to other topics. For each of these fast-rising terms, a score is determined in relation to the results returned by a search, such as the Google custom search engine. However, it will be appreciated, that the same processing and scoring may be modified to also apply to popular search terms (e.g., high frequency of selection) or popular search terms over a predetermined period of time.

One example of the process for scoring fast-rising terms is as follows:

1. Select the set of fast-rising search terms
2. For each term, query the Google custom search engine, and return a set of results.
3. For each document in the result set:
   (i). Assign term a weight of zero for the document.
   (ii). If the term is in the link in seo form ("tiger-woods-press-conference"), give it a score of 100
   (iii). Else if all of the tokens of the term are in the link, give it a 99
   (iv). Else if the term is the same as the title, give it a 100
   (v). Else if the term in the title, give it a 99
   (vi). Else if the tokens of the term are in the title, give it a 95
   (vii). Else if the term in the text body, score as the percentage distance from the end of the text, so 90 would mean the term occurred 10% of the way into the text
   (viii). Else if all the tokens occur at least twice, score as the frequency of the minimum occurring token times 10, with a ceiling of 90.

The relevant function corresponding to the above process is as follows:

```
def assignWeight(term, link, title):
    """ assign a weight to the term """
    weight = 0
    seoterm = '-'.join(term.lower( ).split( ))
    # term is in the link
    if seoterm in link:
        weight = 100
    # parts are in the link
    elif all([t in link.lower( ) for t in term.split( )]):
        weight = 99
    # term is the title, exactly
    elif term == title.lower( ):
        weight = 100
    # term in title
    elif term in title.lower( ):
        weight = 99
    # all title tokens in term
    elif all([t in title.lower( ) for t in term.split( )]):
        weight = 95
    else:
        try:
            html = urllib.urlopen(link).read(-1)
            scrubbed = cleaner.clean_html(html)
            text = \
              lxml.html.fromstring(scrubbed).text_content( ).lower( )
            total = len(text)
            offset = text.find(term)
            # check full match
            if offset >= 0:
                weight = int("%0.f" % ((total − offset) * 1.0/total
                    * 100 ))
            # all terms there?
            elif not isQuoted(term):
                min_count = min([text.count(t) for t in term.split( )])
                if min_count > 2:
                    weight = int(min([min_count*10, 90]))
        except: # IOError, UnicodeDecode
            pass
    return weight
```

In summary, one example of determining a score includes determining a relative score by a score computation based on percentile ranking. For example, percentile rank may be based on computing the frequency of a set of keywords. The frequency is assigned to the keyword as a raw score and depends on the number of times that keyword appears. If, for example, the keyword "dog" appears fifty times, it is assigned a frequency raw score of 50. Based on the raw score, a percentile rank is computed for each keyword. The raw scores may be sorted in descending order. Each keyword is ranked based on the percent of values less than its score. For each document, the keyword score is assigned relative to the overall percentage rank of that keyword.

Scoring may be determined in other ways. In a search query returning a set of results, for each document in the result weights may be utilized to rank the set of results. Assigning a weight score to a search term may be determined based on the location of that search term in a document result. For example, a term located in a link may be given a different weight than if the term is located in the title of the document or in the text body of the document. The number of times a term appears in a document may be another factor, and so on. Weight distribution may be based on one or a combination of these factors.

Figure 5:
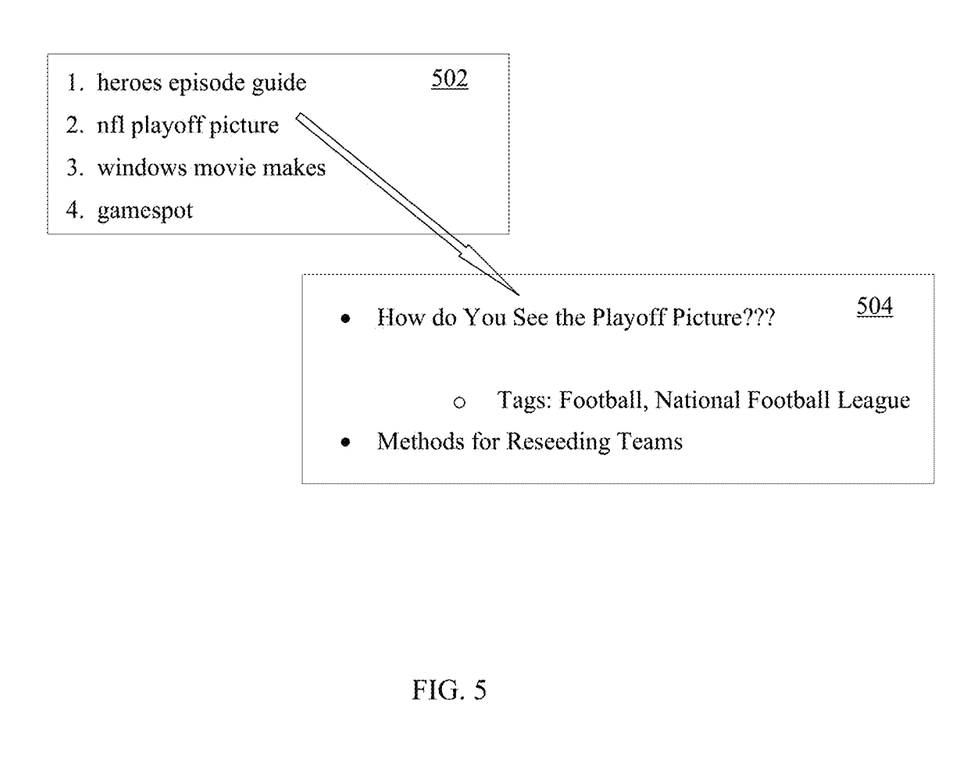
FIG. 5 is a representation of a user interface according to one embodiment.

FIG. 5 illustrates a user interface that can be provided as a result of the tagging. In particular, topic page 502 can be presented to users, as a web page displayed in a browser or in any other manner, to provide the user with popular topics or topics based on the user's profile. As an example, selection of the topic "nfl playoff picture" will result in display of article page 504 which shows article titles and tags associated with the articles in the selected topic. The article titles can be linked to the full article.

Tagged content should be organized into topics in order to be presented on topic page 502, and may be created through either a manual or automatic process. Like a tag, a topic is a term, but it may or may not occur in the source document. For example, an article on the television show "CSI" may be assigned to the "television" topic, even if the term "television" does not appear explicitly in the document.

The embodiment can provide data and analysis relating to "topic consumption". New categories can be created based on user interaction with the content. Data and reports of such user interaction can be collected, aggregated, and processed. This can be used to give content owners insight into how the content is being used across domains and present opportunities for repurposing of content.

Figure 6:
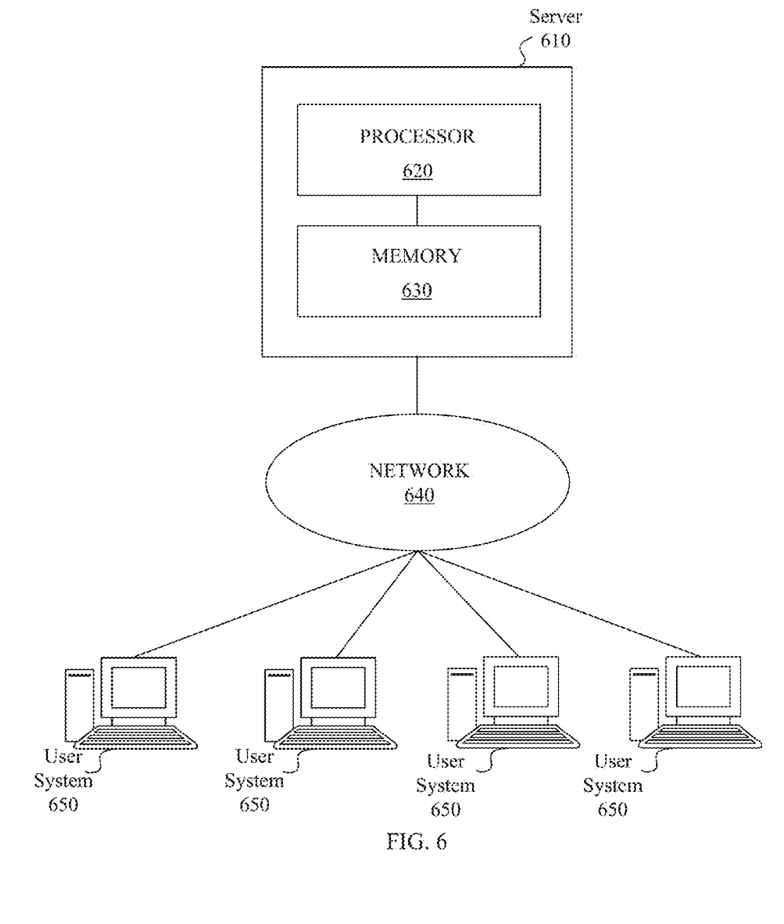
FIG. 6 is a block diagram of a system architecture according to one embodiment.

FIG. 6 illustrates an embodiment of a system of computing devices for effecting the functions described above. Server 610 that is connected over network 640 to a plurality of user systems 650. Server 610 includes processor 620 and memory 630, which are in communication with one another. Server 610 is configured to deliver documents to users at the plurality of user systems 650. Server 610 is typically a computer system, and may be an HTTP (Hypertext Transfer Protocol) server, such as an Apache server. Server 610 may be built using a standard LAMP or other solution stack. Memory 630 may be any type of storage media that may be volatile or non-volatile memory that includes, for example, read-only memory (ROM), random access memory (RAM), magnetic disk storage media, optical storage media, flash memory devices, and zip drives. Network 640 may be a local area network (LAN), wide area network (WAN), a telephone network, such as the Public Switched Telephone Network (PSTN), an intranet, the Internet, or combinations thereof. The plurality of user systems 650 may be mainframes, minicomputers, personal computers, laptops, personal digital assistants (PDAs), cell phones, netbooks, thin clients, and other computing devices. The plurality of user systems 650 are characterized in that they are capable of being connected to network 640. The plurality of user systems 650 typically includes web browsers.

In use, when a user of one of the plurality of user systems 650 wants to, for example, search for and navigate to a document as described above, a request to access content is communicated to server 610 over network 640. For example, a signal is transmitted from one of the user systems 650, the signal having a destination address (e.g., address representing the server), a request (e.g., content request), and a return address (e.g., address representing the user system that initiated the request). Processor 620 accesses memory 630 to provide the requested content, which is communicated to the user over network 640. For example, another signal may be transmitted that includes a destination address corresponding to the return address of the client system, and the content responsive to the request.

Figure 7:
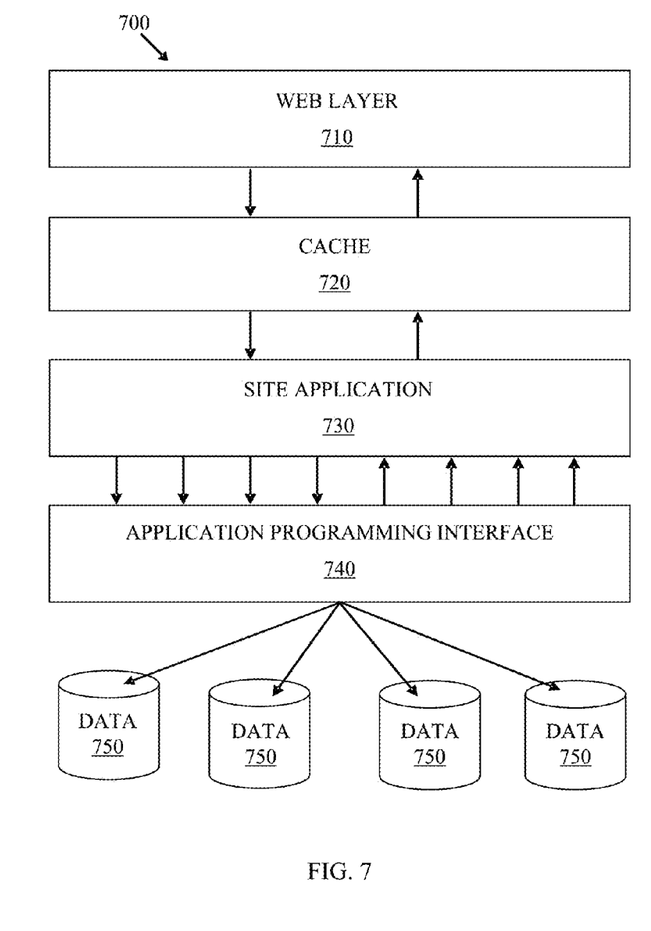
FIG. 7 is a block diagram of another architecture for implementing the method according to one embodiment.

As shown in FIG. 7, system architecture 700 includes web layer 710, cache 720, site application 730, application programming interface 740, and a plurality of data stores 750. It will be appreciated that the system architecture may vary from the illustrated architecture. For example, web layer 710 may directly access data stores 750, the site application may directly access data stores 750, system architecture 700 may not include cache 720, etc., as will be appreciated by those skilled in the art. Data stores 750 include a repository of data in accordance with any manner previously described. Web layer 710 is configured to receive user requests, for example, to navigate a document, through a web browser and return content that is responsive to the user request. Web layer 710 communicates the user requests to cache 720. Cache 720 is configured to temporarily store content that is accessed frequently by web layer 710 and can be rapidly accessed by web layer 710. In one embodiment, cache 720 may be a caching proxy server. Cache 720 communicates the user requests to site application 730.

Site application 730 is configured to update cache 720 and to process user requests received from web layer 719. Site application 730 may identify that the user request is for a page that includes data from multiple sources. Site application 730 can then convert the page request into a request for content from multiple sources and transmits these requests to application programming interface 740. Application programming interface 740 is configured to simultaneously access data from the plurality of data stores 750 to collect the data responsive to the plurality of requests from site application 730. The plurality of data stores 750 may include, for example, content items, an activity log, data indicating search queries resulting in the location of a content item, and the like. It will be appreciated that in alternative embodiments only one data store 750 may be provided to store the data.

The data in data stores 750 is provided to application programming interface 740, which provides the content to site application 730. Site application 730 updates cache 720 and delivers the cached content in combination with the accessed content to web layer 710, which delivers browsable content to the user.

Figure 8:
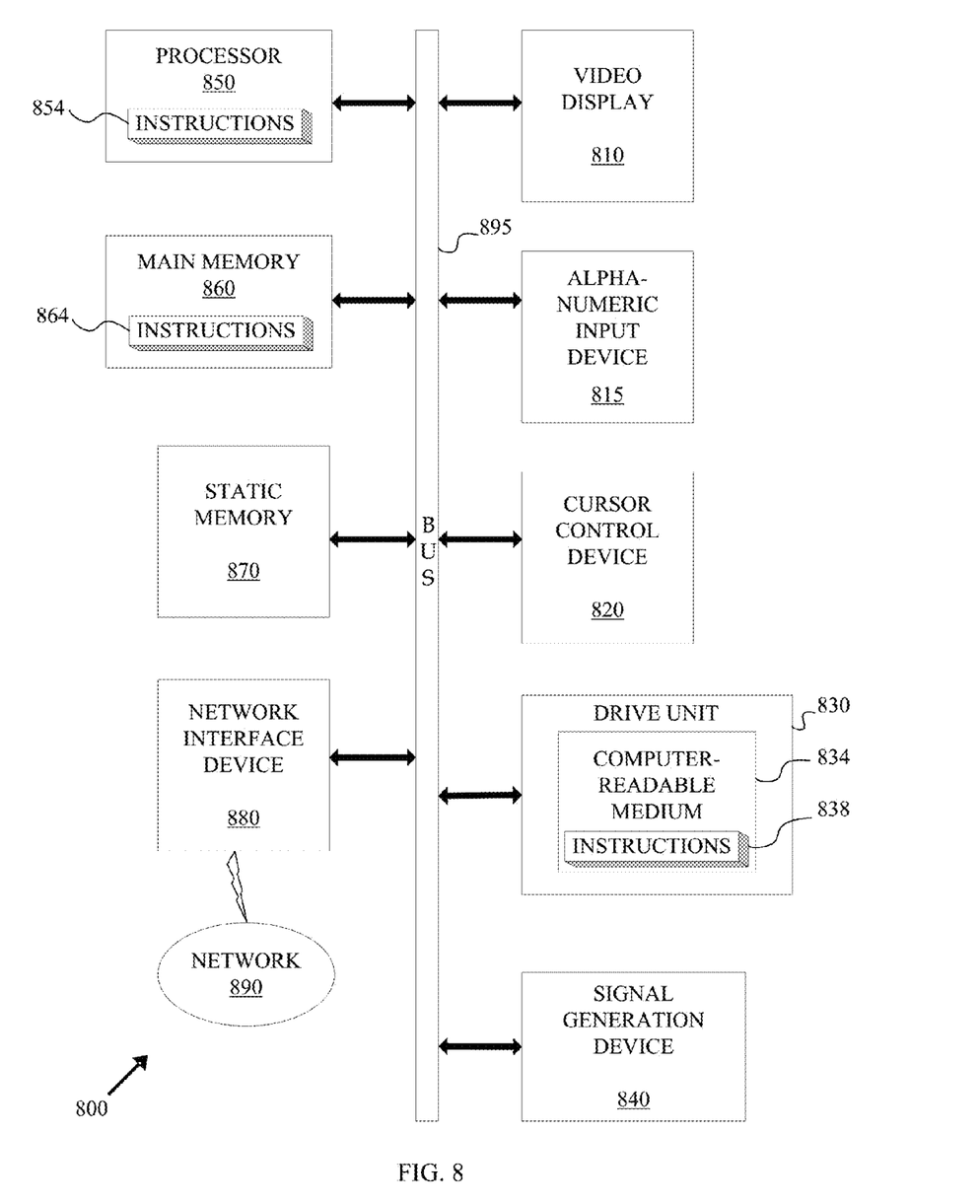
FIG. 8 is a block diagram of a computer system according to one embodiment.

FIG. 8 shows a diagrammatic representation of a machine in the exemplary form of computer system 800 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Computer system 800 includes processor 850 (e.g., a central processing unit (CPU), a graphics processing unit (GPU) or both), main memory 860 (e.g., read only memory (ROM), flash memory, dynamic random access memory (DRAM) such as synchronous DRAM (SDRAM) or Rambus DRAM (RDRAM), etc.) and static memory 870 (e.g., flash memory, static random access memory (SRAM), etc.), which communicate with each other via bus 595.

Computer system 800 may further include video display unit 810 (e.g., a liquid crystal display (LCD) or a cathode ray tube (CRT)). Computer system 800 also includes alphanumeric input device 815 (e.g., a keyboard), cursor control device 820 (e.g., a mouse), disk drive unit 830, signal generation device 840 (e.g., a speaker), and network interface device 880.

Disk drive unit 830 includes computer-readable medium 834 on which is stored one or more sets of instructions (e.g., software 838) embodying any one or more of the methodologies or functions described herein and causing a processor, such as processor 850, to carry out those functions when executed. Software 838 may also reside, completely or at least partially, within main memory 860 and/or within processor 850 during execution thereof by computer system 800, main memory 860 and processor 850 also constituting computer-readable media. Software 838 may further be transmitted or received over network 890 via network interface device 880.

While computer-readable medium 834 is shown in an embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the machine and that cause the machine to perform any one or more of the methodologies of the present description of the technology. The term "computer-readable medium" shall accordingly be taken to include, but not be limited to, solid-state memories, and optical and magnetic media.

The functions of the embodiment can be described as modules of computer executable instructions recorded on tangible media. The modules can be segregated in various manners over various devices.

The description of various embodiments can be applied to any type of content, such as multimedia content, including video content to be downloaded or streamed.

Figure 9:
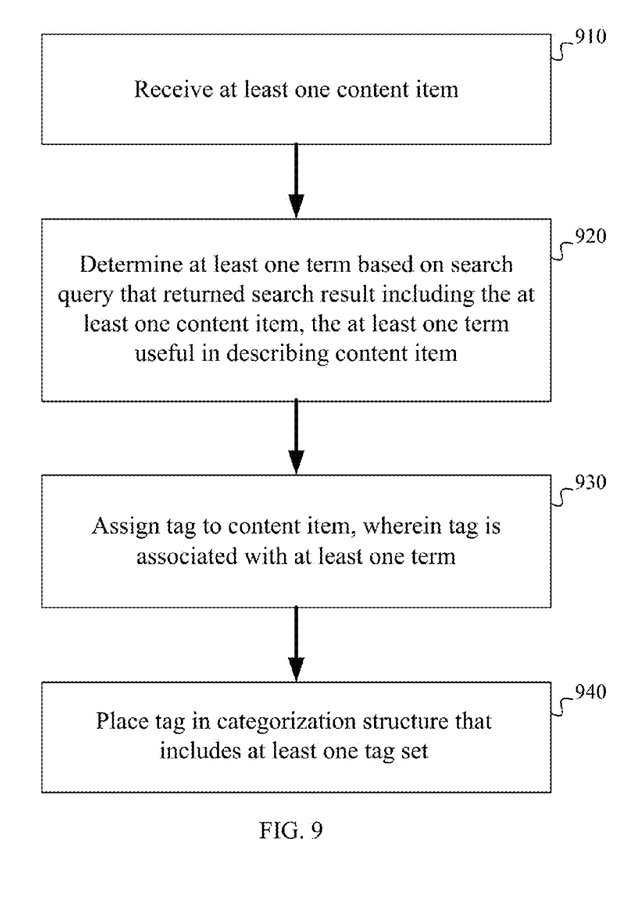
FIG. 9 is flowchart illustrating a tagging process according to another embodiment.

FIG. 9 illustrating a tagging process for assigning a tag to a content item, according to another embodiment. At step 910, at least one content item is received by a computing device. At step 920 at least one term is determined, by the computing device, based on a search query that returned a search result including the at least one content item, the at least one term being useful in describing the content item. At step 930, a tag is assigned to a content time, by the computing device, to the content item, wherein the tag is associated with the at least one term. At step 940, the tag is placed, by the computing device, in a categorization structure that includes at least one tag set.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present description of technology has been described in relation to particular examples, which are intended in all respects to be illustrative rather than restrictive. Those skilled in the art will appreciate that many different combinations of hardware, software, and firmware will be suitable for practicing the present description of the technology.

The one or more of the various embodiments described is achieved by manipulating data structures and transforming the data from one form, useable by a computer for one purpose, to another form, useable by a computer for another purpose.

Other implementations of technology will be apparent to those skilled in the art from consideration of the specification and practice of the various embodiments disclosed herein. Various aspects and/or components of the described embodiments may be used singly or in any combination. It is intended that the specification and examples be considered as embodiments of the technology, with a true scope and spirit of the invention(s) being indicated by the following claims.

What is claimed:

1. An apparatus for assigning a tag to a content item, said apparatus comprising:
   one or more processors; and
   one or more memories operatively coupled to at least one of the one or more processors and having instructions stored thereon that, when executed by at least one of the one or more processors, cause at least one of the one or more processors to:
   receive an activity log for a content item, the content item being stored within a searchable digital content item environment, said activity log including data indicating one or more search queries that resulted in the content item being located by a search engine and accessed by a user;
   determine at least one keyword associated with at least one of the one or more search queries that resulted in the content item being located by a search engine and accessed by a user; and
   assign a tag to the content item, wherein the tag is associated with the at least one keyword.

2. The apparatus of claim 1, wherein the searchable digital content environment is implemented over a network.

3. The apparatus of claim 1, wherein the processor is further configured to determine a relative score for content items in a set with respect to specified keywords, and wherein said step of assigning a tag comprises tagging the content items having a predetermined score range.

4. The apparatus of claim 3, wherein said score is a percentile rank.

5. The apparatus of claim 1, wherein the content item is a document.

6. The apparatus of claim 1, wherein the content item is a web page that describes video content.

7. The apparatus of claim 1, wherein the content item is video content.

8. At least one non-transitory computer-readable medium storing computer-readable instructions that, when executed by at least one of one or more computing devices, cause at least one of the one or more computing devices to:
   receive an activity log for a content item, the content item being stored within a searchable digital content item environment, said activity log including data indicating one or more search queries that resulted in the content item being located by a search engine and accessed by a user;

determine at least one keyword associated with at least one of the one or more search queries that resulted in the content item being located by a search engine and accessed by a user; and assign a tag to the content item, wherein the tag is associated with the at least one keyword.

9. The at least one non-transitory computer-readable medium of claim 8, wherein the digital content environment is implemented over a network.

10. The at least one non-transitory computer-readable medium of claim 8, wherein said instructions for the determining step comprises determining a relative score for content items in a set with respect to specified keywords, and wherein said step of assigning a tag comprises tagging the content items having a predetermined score range.

11. The at least one non-transitory computer-readable medium of claim 10, wherein said score is a percentile rank.

12. The at least one non-transitory computer-readable medium of claim 8, wherein the content item is a document.

13. The at least one non-transitory computer-readable medium of claim 8, wherein the content item is a web page that describes video content.

14. The at least one non-transitory computer-readable medium of claim 8, wherein the content item is video content.

15. An apparatus for assigning a tag to a content item, said apparatus comprising:

one or more processors; and one or more memories operatively coupled to at least one of the one or more processors and having instructions stored thereon that, when executed by at least one of the one or more processors, cause at least one of the one or more processors to:

receive a content item that has been accessed by a user;

determine at least one term associated with at least one of one or more search queries that resulted in the content item being located by a search engine and accessed by the user, the at least one term being useful in describing the content item;

assign a tag to the content item, wherein the tag is associated with the at least one term; and place the tag in a categorization structure that includes at least one tag set.

16. The apparatus of claim 15, wherein the at least one term useful in describing the content item comprises metadata.

17. The apparatus of claim 15, wherein at least one of the one or more memories has further instructions stored thereon that, when executed by at least one of the one or more processors, cause at least one of the one or more processors to allow editing of the term or tag.

18. The apparatus of claim 15, wherein at least one of the one or more memories has further instructions stored thereon that, when executed by at least one of the one or more processors, cause at least one of the one or more processors to assign at least one of a tag type, tag identification and a topic to the assigned tag.

19. The apparatus of claim 15, wherein determining the at least one term includes considering at least one activity attribute, wherein the at least one activity attribute is one of time spent viewing the content item, links activated in the content item, and edits made to the content item.

20. The apparatus of claim 15, wherein the content item is a document.

21. At least one non-transitory computer-readable medium storing computer-readable instructions that, when executed by at least one of one or more computing devices, cause at least one of the one or more computing devices to:

receive a content item that has been accessed by a user;

determine at least one term associated with at least one of one or more search queries that resulted in the content item being located by a search engine and accessed by the user, the at least one term being useful in describing the content item;

assign a tag to the content item, wherein the tag is associated with the at least one term; and place the tag in a categorization structure that includes at least one tag set.

22. The at least one non-transitory computer-readable medium of claim 21, wherein the at least one term useful in describing the content item comprises metadata.

23. The at least one non-transitory computer-readable medium of claim 21, further comprising instructions for allowing editing of the term or tag.

24. The at least one non-transitory computer-readable medium of claim 21, further comprising instructions for assigning at least one of a tag type, tag identification and a topic to the assigned tag.

25. The at least one non-transitory computer-readable medium of claim 21, wherein the instructions for determining at least one term includes instructions for considering at least one activity attribute, wherein the at least one activity attribute is one of time spent viewing the content item, links activated in the content item, and edits made to the content item.

26. The at least one non-transitory computer-readable medium of claim 21, wherein the content item is a document.

* * * * *